April 2, 1957   J. COUPLET   2,787,375
SCREENER FOR BEETS AND SIMILAR GOODS
Filed July 20, 1953   3 Sheets-Sheet 3

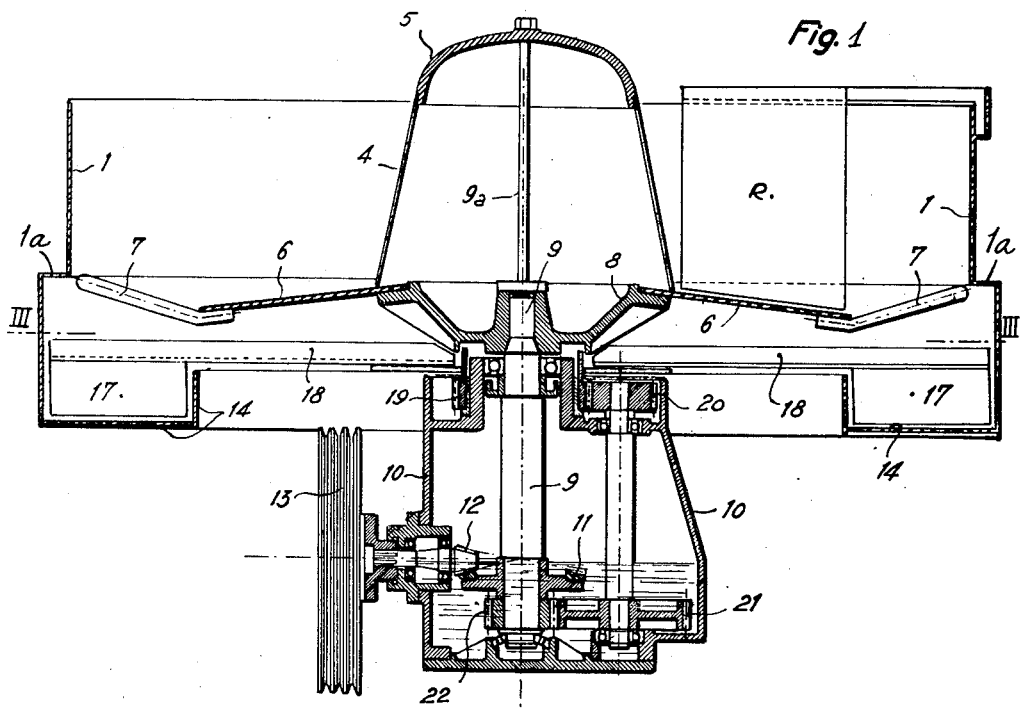
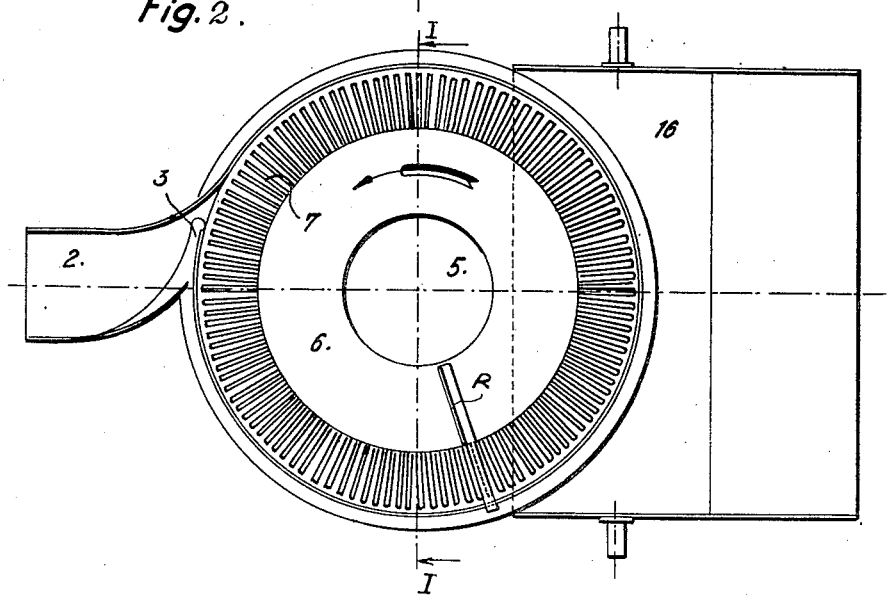

Inventor:
Jean Couplet
by J. Delater-Seguy
Attorney

United States Patent Office 2,787,375
Patented Apr. 2, 1957

2,787,375

SCREENER FOR BEETS AND SIMILAR GOODS

Jean Couplet, Wez-Velvain, Belgium

Application July 20, 1953, Serial No. 369,053

Claims priority, application France July 31, 1952

5 Claims. (Cl. 209—350)

The present invention relates to a screener for eliminating from beets and similar goods the particles of earth, the leaves and the grass adhering to said beets or mixed therewith.

This screener is mainly characterised in that it comprises a fixed vat having a lateral spout for the evacuation of the beets and a rotary bottom the surface of which is formed at least along its periphery by a grating constituted by freely outstanding radial bars.

Advantageously an annular trough is placed below said grating, for receiving the earth and vegetable fragments separated from the beets.

The bottom of said trough is advantageously formed with a discharge opening, and a rotary scraping device is provided in said trough for pushing the earth and vegetable fragments towards said discharge opening.

In a preferred embodiment, to which the invention is however not limited, the screener may further include the following features which can be applied separately or in various combinations:

(a) The central portion of the vat bottom is formed by a deflector adapted to prevent the beets and earth poured into the vat from forming a central heap.

(b) The bottom surface of the vat which surrounds the base of the aforesaid deflector comprises a solid portion which preferably slopes downwards from the centre towards the periphery, while the grating which surrounds said solid portion preferably slopes in the opposite direction.

(c) A fixed scraper is placed above the solid portion of the vat bottom.

(d) The threshold of the spout through which the beets are evacuated forms a ridge the height of which increases in the direction of rotation of the grating.

(e) Below the discharge opening of the trough is placed a tipping bucket by means of which the earth and vegetable fragments can be returned into the vehicle which has transported the beets to be screened, so that the tare of the load of beets may be determined.

The appended drawings show by way of example an embodiment of the screener forming the object of the invention.

Fig. 1 is a vertical section of the empty screener (without its supporting frame), on line I—I of Fig. 2.

Fig. 2 is a plan view of the screener, at a smaller scale.

Figure 4:
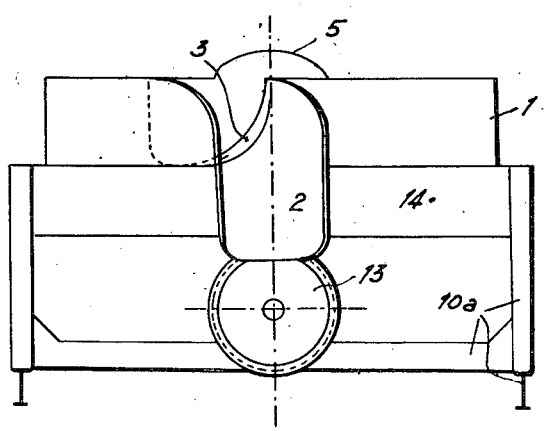
Fig. 4 is a side elevation facing the spout through which the beets are evacuated.
Figure 5:
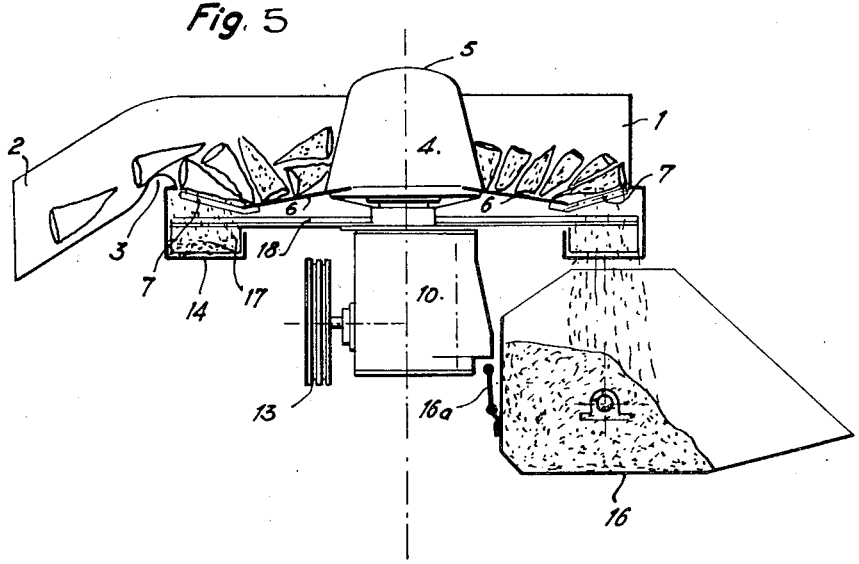
Fig. 5 is a vertical section of the screener filled with beets.

On the drawings, 1 is the fixed vat which is for example made of sheet metal and has a spout 2 for the evacuation of the beets. The threshold of this spout is provided with a ridge 3 (Figs. 2, 4 and 5) the height of which increases in the direction of rotation of the rotary bottom of the vat 1.

This rotary bottom comprises a central portion which forms a conical deflector 4, made for example of sheet metal, which is closed at the top by a cover 5. Around the base of this deflector 4 the bottom proper comprises a solid portion 6 which preferably slopes downwards from the centre towards the periphery, and a grating 7 formed by radial bars which are free at their outer ends and are preferably sloping upwards towards the periphery. The solid bottom portion 6 is fastened on a hub 8 keyed to a shaft 9, an upward extension 9a of which carries the cover 5 of the deflector 4.

The shaft 9 is centrally mounted by roller bearings in a housing 10 supported on a frame 10a (Fig. 4) and is driven at its lower end by a pair of bevel gears 11, 12 (Fig. 1) which are rotated by a pulley 13 driven by an engine through a suitable transmission (not shown).

The speed of rotation of the grating 7 is preferably regulated in such manner that the centrifugal force at the outer ends of its bars is about twice the force of gravity.

Figure 6:
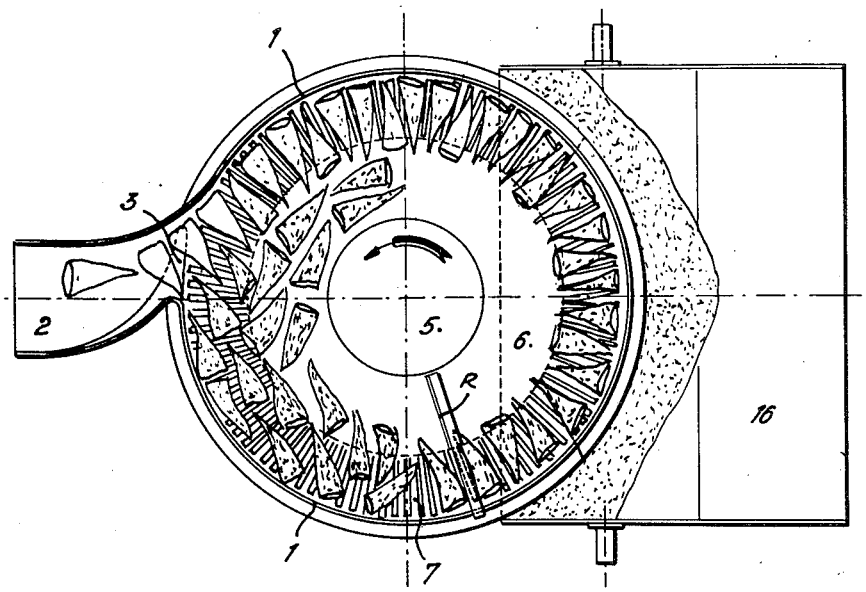
Fig. 6 is a corresponding plan view.

A fixed scraper R is mounted above the solid portion 6 of the vat bottom (see Figs. 1, 2 and 6).

Figure 3:
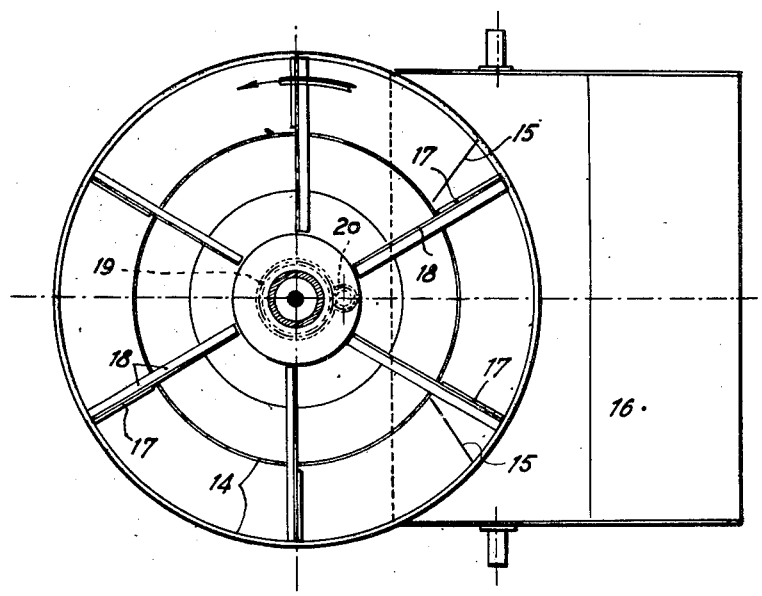
Fig. 3 is a horizontal section at the level III—III of Fig. 1.

Below the grating 7 is mounted a fixed annular trough 14 which may be integral with the vat 1 and receives the earth and vegetable fragments separated from the beets. The bottom of this trough has a discharge opening 15 (Fig. 3) below which may be placed a tipping bucket 16 adapted to be tipped by the actuation of an unlocking lever 16a.

In the trough 14 is mounted a scraping device formed by vanes 17 on arms 18 which are carried by a ring 19. This ring is toothed and is rotated by gear-wheels 20, 21 and 22, the wheel 22 being keyed on the lower portion of the shaft 9, and the rate of transmission being such that the angular speed of the vanes 17 is one quarter of that of the grating 7.

The above described screener operates as follows:

The beets are poured on the cover 5 of the deflector 4 and distribute themselves on the solid portion 6 of the rotary bottom. Under the combined effect of the rotation and of the centrifugal force the beets spread over the grating 7 and reach the stationary outer wall of the vat 1. Due to their friction against this wall, the beets roll upon themselves and are propelled at a speed which is lower than that of the grating 7, so that friction is determined also between the beets and the grating. This friction separates the beets from the adhering earth particles, grass and leaves which fall, together with the foreign bodies happening to be among the beets, through the intervals between the bars of the grating 7 and into the trough 14 from where they are evacuated by the scraping vanes 17.

In order to facilitate the ejection of the grass, leaves and other impurities from the bars of the grating 7, under the effect of the centrifugal force, the peripheral wall of the vat 1 is formed at the level of the outer ends of said bars with an outwardly directed shoulder 1a, below which the vat has a larger diameter than in its portion lying above said shoulder.

On the other hand, any earth particles and other undesired elements which fall directly upon the solid portion 6 of the rotary bottom and tend to adhere to the same are detached therefrom by the scraper R which directs them towards the grating 7, through which they also fall into the trough 14.

Any particles which might tend to adhere to the bars of the grating 7 are detached therefrom by the centrifugal force and by the beets moving under its effect up to the outer ends of said bars, so that these particles also fall under the grating.

The beets, after turning around in the vat 1, reach the threshold 3, pass over the same and fall into the spout 2, as shown on Fig. 6, where the still uncleaned beets have been dotted so as to be distinguishable from the clean ones.

It will be understood that the invention is not limited to the embodiment which has been described and shown, but covers also any modifications embodying the features of the invention as defined in the appended claims.

I claim:

1. A screener for beets and similar goods, comprising a fixed vat, a lateral beet evacuating spout on said vat and a rotary bottom in said vat, freely outstanding radial bars forming at least the peripheral portion of said rotary bottom, said radial bars being unconnected to each other in said peripheral portion, and the radial spaces between said radial bars being unobstructed over their entire radial length.

2. A screener for beets and similar goods, comprising a fixed vat, a lateral beet evacuating spout on said vat, a rotary bottom in said vat, freely outstanding radial bars forming at least the peripheral portion of said rotary bottom, said radial bars being unconnected to each other in said peripheral portion, the radial spaces between said radial bars being unobstructed over their entire radial length, and an annular trough below said peripheral portion, said trough having a discharge opening.

3. A screener for beets and similar goods, comprising a fixed vat having a peripheral wall, a beet evacuating spout on said peripheral wall, a rotary bottom in said vat, freely outstanding radial bars forming at least the peripheral portion of said rotary bottom, and a shoulder formed in said peripheral wall at the level of the outer ends of said bars, the portion of said peripheral wall lying below said shoulder being larger in diameter than the portion of said peripheral wall lying above said shoulder.

4. A screener for beets and similar goods, comprising a fixed vat, a lateral beet evacuating spout on said vat and a rotary bottom in said vat, said rotary bottom comprising a central upstanding deflector, a solid bottom portion surrounding the base of said deflector and radial bars projecting freely beyond the peripheral edge of said solid bottom portion, said screener comprising further a fixed scraper above said solid bottom portion.

5. A screener for beets and similar goods comprising a fixed vat, a lateral beet evacuating spout on said vat, a rotary bottom on said vat, freely outstanding radial bars forming at least the peripheral portion of said rotary bottom, and a ridge at the threshold of the passage from said vat into said spout, the height of said ridge increasing in the direction of rotation of said rotary bottom.

References Cited in the file of this patent

UNITED STATES PATENTS

| | | |
|---|---|---|
| 474,662 | Hoyt | May 10, 1892 |
| 495,545 | Eberle | Apr. 18, 1893 |
| 931,280 | Cunningham | Aug. 17, 1909 |
| 988,255 | Dodds | Mar. 28, 1911 |
| 1,717,902 | Wiencke | June 18, 1929 |